(12) United States Patent
Srinivasan et al.

(10) Patent No.: US 8,200,961 B2
(45) Date of Patent: Jun. 12, 2012

(54) SECURING A FLASH MEMORY BLOCK IN A SECURE DEVICE SYSTEM AND METHOD

(75) Inventors: Pramila Srinivasan, Palo Alto, CA (US); John Princen, Cupertino, CA (US); Andy Chan, San Jose, CA (US); Paul Mielke, Palo Alto, CA (US); Rob Wheeler, Cupertino, CA (US)

(73) Assignee: iGware, Inc., Mountain View, CA (US)

( * ) Notice: Subject to any disclaimer, the term of this patent is extended or adjusted under 35 U.S.C. 154(b) by 1294 days.

(21) Appl. No.: 11/679,108

(22) Filed: Feb. 26, 2007

(65) Prior Publication Data

US 2008/0117679 A1    May 22, 2008

Related U.S. Application Data

(60) Provisional application No. 60/860,049, filed on Nov. 19, 2006.

(51) Int. Cl.
*H04L 29/08* (2006.01)
(52) U.S. Cl. .......................................... 713/161
(58) Field of Classification Search .................. 713/156, 713/161, 170; 365/185.04
See application file for complete search history.

(56) References Cited

U.S. PATENT DOCUMENTS

| | | |
|---|---|---|
| 5,095,798 A | 3/1992 | Okada et al. |
| 5,184,830 A | 2/1993 | Okada et al. |
| 5,238,250 A | 8/1993 | Leung et al. |
| 5,261,069 A | 11/1993 | Wilkinson et al. |
| 5,367,698 A | 11/1994 | Webber et al. |
| 5,400,402 A | 3/1995 | Garfinkle |
| 5,404,505 A | 4/1995 | Levinson |
| 5,426,763 A | 6/1995 | Okada |
| 5,528,513 A | 6/1996 | Vaitzblit et al. |
| 5,586,264 A | 12/1996 | Belknap et al. |
| 5,610,839 A | 3/1997 | Karolak et al. |
| 5,638,443 A | 6/1997 | Stefik et al. |
| 5,715,398 A | 2/1998 | Lubenow et al. |
| 5,715,403 A | 2/1998 | Stefik |
| 5,765,152 A | 6/1998 | Erickson |
| 5,781,901 A | 7/1998 | Kuzma |
| 5,790,170 A | 8/1998 | Suzuki |

(Continued)

FOREIGN PATENT DOCUMENTS

EP    0 992 922 A1    4/2000

(Continued)

OTHER PUBLICATIONS

Search Report and Written Opinion mailed May 5, 2008 from International Serial No. PCT/US2007/019956 filed Sep. 14, 2007.

(Continued)

*Primary Examiner* — Ellen Tran
(74) *Attorney, Agent, or Firm* — Sheppard Mullin Richter & Hampton LLP

(57) ABSTRACT

A technique for securing a flash memory block in a secure device system involves cryptographic techniques including the generation of a Message Authentication Code (MAC). The MAC may be generated each time a file is saved to one or more data blocks of a flash memory device and stored with the file's metadata and to each of the data blocks. A technique for reading and storing versioned files may be employed when applications utilize versioning.

23 Claims, 5 Drawing Sheets

U.S. PATENT DOCUMENTS

| | | | |
|---|---|---|---|
| 5,809,242 A | 9/1998 | Shaw et al. |
| 5,815,662 A | 9/1998 | Ong |
| 5,818,512 A | 10/1998 | Fuller |
| 5,829,046 A | 10/1998 | Tzelnic et al. |
| 5,867,223 A | 2/1999 | Schindler et al. |
| 5,892,900 A | 4/1999 | Ginter et al. |
| 5,903,723 A | 5/1999 | Beck et al. |
| 5,905,860 A | 5/1999 | Olsen et al. |
| 5,913,039 A | 6/1999 | Nakamura et al. |
| 5,933,498 A | 8/1999 | Schneck et al. |
| 5,983,227 A | 11/1999 | Nazem et al. |
| 6,016,348 A | 1/2000 | Blatter et al. |
| 6,032,200 A | 2/2000 | Lin |
| 6,038,601 A | 3/2000 | Lambert et al. |
| 6,044,157 A | 3/2000 | Uesaka et al. |
| 6,049,821 A | 4/2000 | Theriault et al. |
| 6,052,720 A | 4/2000 | Traversat et al. |
| 6,085,193 A | 7/2000 | Malkin et al. |
| 6,141,756 A | 10/2000 | Bright et al. |
| 6,148,340 A | 11/2000 | Bittinger et al. |
| 6,157,721 A | 12/2000 | Shear et al. |
| 6,167,441 A | 12/2000 | Himmel |
| 6,185,625 B1 | 2/2001 | Tso et al. |
| 6,205,475 B1 | 3/2001 | Pitts |
| 6,212,657 B1 | 4/2001 | Wang et al. |
| 6,219,680 B1 | 4/2001 | Bernardo et al. |
| 6,219,708 B1 | 4/2001 | Martenson |
| 6,226,618 B1 | 5/2001 | Downs et al. |
| 6,243,719 B1 | 6/2001 | Ikuta et al. |
| 6,256,637 B1 | 7/2001 | Venkatesh et al. |
| 6,259,471 B1 | 7/2001 | Peters et al. |
| 6,289,452 B1 | 9/2001 | Arnold et al. |
| 6,292,899 B1 | 9/2001 | McBride |
| 6,321,209 B1 | 11/2001 | Pasquali |
| 6,330,566 B1 | 12/2001 | Durham |
| 6,338,050 B1 | 1/2002 | Conklin et al. |
| 6,371,854 B1 | 4/2002 | Ikeda et al. |
| 6,377,972 B1 | 4/2002 | Guo et al. |
| 6,412,011 B1 | 4/2002 | Guo et al. |
| 6,389,460 B1 | 5/2002 | Stewart et al. |
| 6,412,008 B1 | 6/2002 | Fields et al. |
| 6,427,238 B1 | 7/2002 | Goodman et al. |
| 6,446,113 B1 | 9/2002 | Ozzie et al. |
| 6,457,126 B1 | 9/2002 | Nakamura et al. |
| 6,466,048 B1 | 10/2002 | Goodman |
| 6,480,883 B1 | 11/2002 | Tsutsumitake |
| 6,500,070 B1 | 12/2002 | Tomizawa et al. |
| 6,510,502 B1 | 1/2003 | Shimizu |
| 6,526,581 B1 | 2/2003 | Edson |
| 6,544,126 B2 | 4/2003 | Sawano et al. |
| 6,557,104 B2 | 4/2003 | Vu et al. |
| 6,571,279 B1 | 5/2003 | Herz et al. |
| 6,574,605 B1 | 6/2003 | Sanders et al. |
| 6,594,682 B2 | 7/2003 | Peterson et al. |
| 6,606,644 B1 | 8/2003 | Ford et al. |
| 6,637,029 B1 | 10/2003 | Maissel et al. |
| 6,654,388 B1 | 11/2003 | Lexenberg et al. |
| 6,669,096 B1 | 12/2003 | Saphar et al. |
| 6,675,350 B1 | 1/2004 | Abrams et al. |
| 6,691,312 B1 | 2/2004 | Sen et al. |
| 6,697,948 B1 | 2/2004 | Rabin et al. |
| 6,704,797 B1 | 3/2004 | Fields et al. |
| 6,785,712 B1 | 8/2004 | Hogan et al. |
| 6,805,629 B1 | 10/2004 | Weiss |
| 6,811,486 B1 | 11/2004 | Luciano, Jr. |
| 6,826,593 B1 | 11/2004 | Acharya et al. |
| 6,832,241 B2 | 12/2004 | Tracton et al. |
| 6,873,975 B1 | 3/2005 | Hatakeyama et al. |
| 6,901,386 B1 | 5/2005 | Dedrick et al. |
| 6,920,567 B1 | 7/2005 | Doherty et al. |
| 6,928,551 B1 | 8/2005 | Lee et al. |
| 6,993,557 B1 | 1/2006 | Yen |
| 7,092,953 B1 | 8/2006 | Haynes |
| 7,099,479 B1 | 8/2006 | Ishibashi et al. |
| 2001/0014882 A1 | 8/2001 | Stefik et al. |
| 2001/0026287 A1 | 10/2001 | Watanabe |
| 2002/0016818 A1 | 2/2002 | Kirani et al. |
| 2002/0032784 A1 | 3/2002 | Darago et al. |
| 2002/0057799 A1 | 5/2002 | Kohno |
| 2002/0059384 A1 | 5/2002 | Kaars |
| 2002/0071557 A1 | 6/2002 | Nguyen |
| 2002/0085720 A1 | 7/2002 | Okada et al. |
| 2002/0116615 A1 | 8/2002 | Nguyen et al. |
| 2002/0137566 A1 | 9/2002 | Tomizawa et al. |
| 2002/0138764 A1 | 9/2002 | Jacobs et al. |
| 2002/0160833 A1 | 10/2002 | Lloyd et al. |
| 2002/0161673 A1 | 10/2002 | Lee et al. |
| 2002/0162115 A1 | 10/2002 | Brucknet et al. |
| 2002/0165022 A1 | 11/2002 | Hiraoka |
| 2002/0165028 A1 | 11/2002 | Miyamoto et al. |
| 2002/0169974 A1 | 11/2002 | McKune |
| 2002/0184160 A1 | 12/2002 | Tadayon et al. |
| 2003/0009423 A1 | 1/2003 | Wang et al. |
| 2003/0023564 A1 | 1/2003 | Padhye et al. |
| 2003/0028622 A1 | 2/2003 | Inoue et al. |
| 2003/0114227 A1 | 6/2003 | Rubin |
| 2003/0120541 A1 | 6/2003 | Siann et al. |
| 2003/0144869 A1 | 7/2003 | Fung et al. |
| 2003/0154381 A1 * | 8/2003 | Ouye et al. ............ 713/182 |
| 2003/0157985 A1 | 8/2003 | Shteyn |
| 2003/0182142 A1 | 9/2003 | Valenzuela et al. |
| 2003/0220142 A1 | 11/2003 | Siegel |
| 2004/0015426 A1 | 1/2004 | Tadayon et al. |
| 2004/0039929 A1 | 2/2004 | Decime |
| 2004/0044901 A1 | 3/2004 | Serkowski |
| 2004/0054923 A1 | 3/2004 | Seago et al. |
| 2004/0098297 A1 | 5/2004 | Borthwick |
| 2004/0098580 A1 | 5/2004 | DeTreville |
| 2004/0098610 A1 | 5/2004 | Hrastar |
| 2004/0102987 A1 | 5/2004 | Takahashi et al. |
| 2004/0111608 A1 * | 6/2004 | Oom Temudo de Castro et al. ................ 713/156 |
| 2005/0004875 A1 | 1/2005 | Kontio et al. |
| 2005/0211759 A1 * | 9/2005 | Breslin et al. ............ 235/375 |
| 2006/0031222 A1 | 2/2006 | Hannsmann |
| 2006/0090084 A1 | 4/2006 | Buer |
| 2006/0129848 A1 | 6/2006 | Paksoy et al. |
| 2006/0156396 A1 | 7/2006 | Hochfield et al. |
| 2006/0242068 A1 | 10/2006 | Jogand-Coulomb et al. |
| 2007/0016832 A1 | 1/2007 | Weiss |
| 2007/0061597 A1 * | 3/2007 | Holtzman et al. ............ 713/193 |
| 2007/0067826 A1 | 3/2007 | Conti |
| 2007/0150730 A1 | 6/2007 | Conti |

FOREIGN PATENT DOCUMENTS

| | | |
|---|---|---|
| EP | 1 091 274 A2 | 4/2001 |
| EP | 1197826 | 4/2002 |
| JP | 2002024178 A1 | 1/2002 |
| WO | WO02/29642 A2 | 4/2002 |
| WO | WO02/30088 A1 | 4/2002 |

OTHER PUBLICATIONS

Search Report mailed Jul. 23, 2010 from European Serial No. 07838199.3 filed Sep. 14, 2007.

Arbaugh, William A., et al., "A Secure and Reliable Bootstrap Architecture," University of Pennsylvania (1996).

Aziz, Ashar, et al., "Privacy and Authentication for Wireless Local Area Networks," Sun Microsystems, Inc., (1993).

Bharadvaj et al., Proceedings of the 17th IEEE Symposium on Reliable Distributed Systems, pp. 118-123 (1998).

Davida, George I., et al., "Defending Systems Against Viruses through Cryptographic Authentication," IEEE pp. 312-318 (1989).

Diffie, Whitfield, "The First Ten Years of Public-Key Cryptography," Proceedings of the IEEE, vol. 96, No. 5, pp. 560-577 (May 1988).

Diffie, Whitfield, et al., "New Directions in Cryptography," (1976).

Dyer, Joan G., et al., "Building the IBM 4758 Secure Coprocessor," Computer, pp. 2-12 (Oct. 2001).

Frantzen, Mike, et al., "StackGhost: Hardware Facilitated Stack Protection," Proceedings of the 10th USENIX Security Symposium (2001).

Fujimura, Ko., et al., "Digital-Ticket-Controlled Digital Ticket Circulation," Proceedings of the 8th USENIX Security Symposium (1999).

Gligor, Virgil D., "20 Years of Operating Systems Security," University of Maryland, (1999).

Gutmann, Peter, "The Design of a Cryptographic Security Architecture," Proceedings of the 8th USENIX Security Symposium (1999).

Hori et al., *Computer Networks*, 33(1-6):197-211 (2000).

Itoi, Naomaru, "SC-CFS: Smartcard Secured Cryptographic File System," Proceedings of the 10th USENIX Security Symposium (2001).

Jaeger, Trent, et al., "Building Systems that Flexibly Control Downloaded Executable Context," Proceedings of the 6th USENIX UNIX Security Symposium (1996).

Karger, Paul A., "New Methods for Immediate Revocation," IEEE (1989).

Kent, Stephen Thomas, "Protecting Externally Supplied Software in Small Computers," Massachusetts Institute of Technology (1980).

Kogan, Noam, et al., "A Practical Revocation Scheme for Broadcast Encryption Using Smart Cards," Proceedings of the 2003 IEEE Symposium on Security and Privacy (2003).

Lampson, Butler, et al., "Authentication in Distributed Systems" Theory and Practice, Digital Equipment Corporation (1992).

Lotspiech, Jeffrey, et al., "Broadcast Encryption's Bright Future," Computer, pp. 57-63 (Aug. 2002).

Lotspiech, Jeffrey, et al., "Anonymous Trust: Digital Rights Management Using Broadcast Encryption," Proceedings of the IEEE, vol. 92, No. 6, pp. 898-909 (Jun. 2004).

Monrose, et al., "Toward Speech-Generated Cryptographic Keys on Resource Constrained Devices," Proceedings of the 11th USENIX Security Symposium (2002).

Nonnenmacher, Jorg et al., "Asynchronous Multicast Push: AMP." 13th International Conference on Computer Commnication, Nov. 18-21, 1997, pp. 419-430,13, Proceedings of International Conference on Computer Communication, Cannes.

Neumann, P.G., et al., "A Provably Secure Operating System," Stanford Research Institute (1975).

Palmer, Elaine R., "An Introduction to Citadel—A Secure Crypto Coprocessor for Workstations," IBM Research Division (1992).

Peterson, David S., et al., "A Flexible Containment Mechanism for Executing Untrusted Code," Proceedings of the 11th USENIX Security Symposium (2002).

Rodriguez, Pablo et al. Improving the WWW: Caching or Multicast? Computer Networks and ISDN Systems. Nov. 25, 1998, 30(22-23):2223-2243.

Rubin, Aviel D., "Trusted Distribution of Software Over the Internet," Internet Society 1995 Symposium on Network and Distributed System Security.

Smith, Sean W., "Secure Coprocessing Applications and Research Issues," Los Alamos Unclassified Release LA-UR-96-2805 (1996).

Smith, Sean W., et al., "Building a High-Performance, Programmable Secure Coprocessor," Secure Systems and Smart Cards, IBM T.J. Watson Research Center, NY (1998).

Smith, Sean W., et al., "Using a High-Performance, Programmable Secure Coprocessor," Proceedings of the Second International Conference on Financial Cryptography, (1998).

Smith, Sean, et al., "Validating a High-Performance, Programmable Secure Coprocessor," Secure Systems and Smart Cards, IBM T.J. Watson Research Center, NY, (1999).

Stefik, Mark, "Trusted Systems," Scientific American, pp. 78-81 (Mar. 1997).

Traylor, Scott, "Graphic Resolution and File Sizes", http://www.traylormm.com/harvard/53graphicresolution/, (1997).

Tygar, J.D., et al., "Strongbox: A System for Self-Securing Programs," pp. 163-197, (1991).

Tygar, J.D. et al., "Dyad: A System for Using Physically Secure Coprocessors," School of Computer Science, Carnegie Mellon University (1991).

Van Doorn, Leendert, "A Secure Java™ Virtual Machine," Proceedings of the 9th USENIX Security Symposium (2000).

Wang, Zheng et al. "Prefetching in World Wide Web." Global TeleCommnications Conference, Nov. 18-22, 1996, pp. 28-32, London.

White, et al., "ABYSS: An Architecture for Software Protection," IEEE Transactions on Software Engineering, vol. 16, No. 6, pp. 619-629(1990).

White, Steve R., et al., "Introduction to the Citadel Architecture: Security in Physically Exposed Environments," IBM Research Division (1991).

Wobber, Edward, et al., "Authentication in the Taso Operating System," Digital Systems Research Center (1993).

Yee, B., et al., "Secure Coprocessors in Electronic Commerce Applications," Proceedings of the First USENIX Workshop on Electronic Commerce (1995).

Yee, B., "Using Secure Coprocessors," PhD Thesis, School of Computer Science, Carnegie Mellon University, Pittsburgh, PA (1994).

David A Dodson, "Gain Some Perspective With Innovation's GBA to TV Converter" Jun. 6, 2002, http://www.viewonline.com/page/articles/innovationsGBATV.htm>, Accessed Mar. 29, 2008.

Game Boy, <http://en.wikipedia.org/wiki/Game_Boy_Advanced> Accessed Mar. 30, 2008.

Game Boy Advance,< http://en.wikipedia.org/wiki/Game_Boy_Advanced> Accessed Mar. 30, 2008.

Game Cube,<http://en.wikipedia.org/wiki/Game_Cube> Accessed Mar. 28, 2008.

* cited by examiner

180
SECURING A FLASH MEMORY BLOCK IN A SECURE DEVICE SYSTEM AND METHOD

CROSS-REFERENCE TO RELATED APPLICATIONS

This application claims priority of U.S. Provisional Application 60/860,049, entitled SECURING A FLASH MEMORY BLOCK IN A SECURE DEVICE SYSTEM AND METHOD, filed Nov. 19, 2006, which is hereby incorporated by reference in its entirety.

BACKGROUND

Flash memory has gained widespread use in consumer devices and appliances where data secrecy and authenticity are substantial requirements. Several techniques are used to provide secrecy and authenticity for data on a flash memory device. The security mechanism may be implemented in the flash memory device driver and associated operating system implementation.

Encryption and decryption of data is common in computer data storage devices. Cryptographic techniques are often employed when storing data. While the employment of such techniques offer a level of security from unauthorized access, different computer platforms utilize the same cryptographic methods when storing and reading data from storage devices. These methods include, but are not limited to, Data Encryption Standard (DES), Advanced Encryption Standard (AES), and SHA (Secure Hash Algorithm) functions. Because different platforms employ common cryptographic methods, it is possible to remove a storage device from one computer and read the encrypted data on another computer which uses the same methods if one has access to the key. For adequate security, the key should not be a common key for every platform, or the security would rely on the secrecy of that single key only.

In some applications, message authentication codes (e.g., HMACs) are used to provide authentication verification data for message blocks. The storage of a MAC in the data block should give rise to acceptable data and read-write performance overhead. One desirable feature is to provide a method that is robust to bit errors in flash memory devices. Another desirable feature is that the data from multiple applications should be protected from each other in the operating system. That is, it should not be possible to use one application to gain access to control or modify another application or its data.

The USB flash drive is a common storage device using flash memory, for its relatively small size offers the end user ease of portability of computer information or data stored thereon. For instance, an end user can install the flash drive device on a USB port of one computer, store the information to the device, remove the device, install it on a USB port of another computer, and read the stored information. Even if the data may be encrypted by one platform, the data is not secure given the employment of common cryptographic techniques on other platforms unless the keys are protected by the platform. In addition, there are a variety of devices available to consumers which allow them to both read and write to the flash memory device. Thus, a further security mechanism is necessary to protect against security breaches of flash memory devices.

The foregoing examples of the related art and limitations related therewith are intended to be illustrative and not exclusive. Other limitations of the related art will become apparent to those of skill in the art upon a reading of the specification and a study of the drawings.

SUMMARY

A technique for providing a security mechanism for the flash memory device and the data blocks integral to it involves the employment of cryptographic methods that extract and use informational variables that are specific to device while installed in one computer platform. The data block is the unit of access of data on the flash memory device. Because a data block of a flash memory device is readable and writable using a variety of devices available to consumers, a mechanism is necessary to protect against security breaches of the flash memory device.

In an illustrative embodiment, data written to the data blocks is encrypted, and a MAC is used for authentication. Data read from the data blocks is decrypted and the MAC is verified. The order is interchangeable. In a typical secure device, a security kernel is loaded with authentication and supports a secure object store, and an API interface to various clients. The encryption/decryption functions, calculation of MAC, and verification of data is performed in the security kernel. The security kernel protects keys in a keys database and enforces the ownership of keys and maintains the secrecy. The key is not accessible to another I/O driver, e.g., the network driver. The key corresponding to the flash device driver is stored in non-volatile memory accessible to the security kernel; alternatively, a key may be generated internally and stored using a random number generator (RNG). The security kernel interfaces with the operating system via an Application Programming Interface (API), which permits only the flash operating system to obtain the key for the purposes of encryption/decryption, calculation of MAC, and verification of data. The key is not exposed across the API boundary. The security kernel can identify the caller and enforce the protections on key usage. Without such protections, other I/O drivers or applications could breach the security of the flash operating system by compromising software or data of any client that can access the security API.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
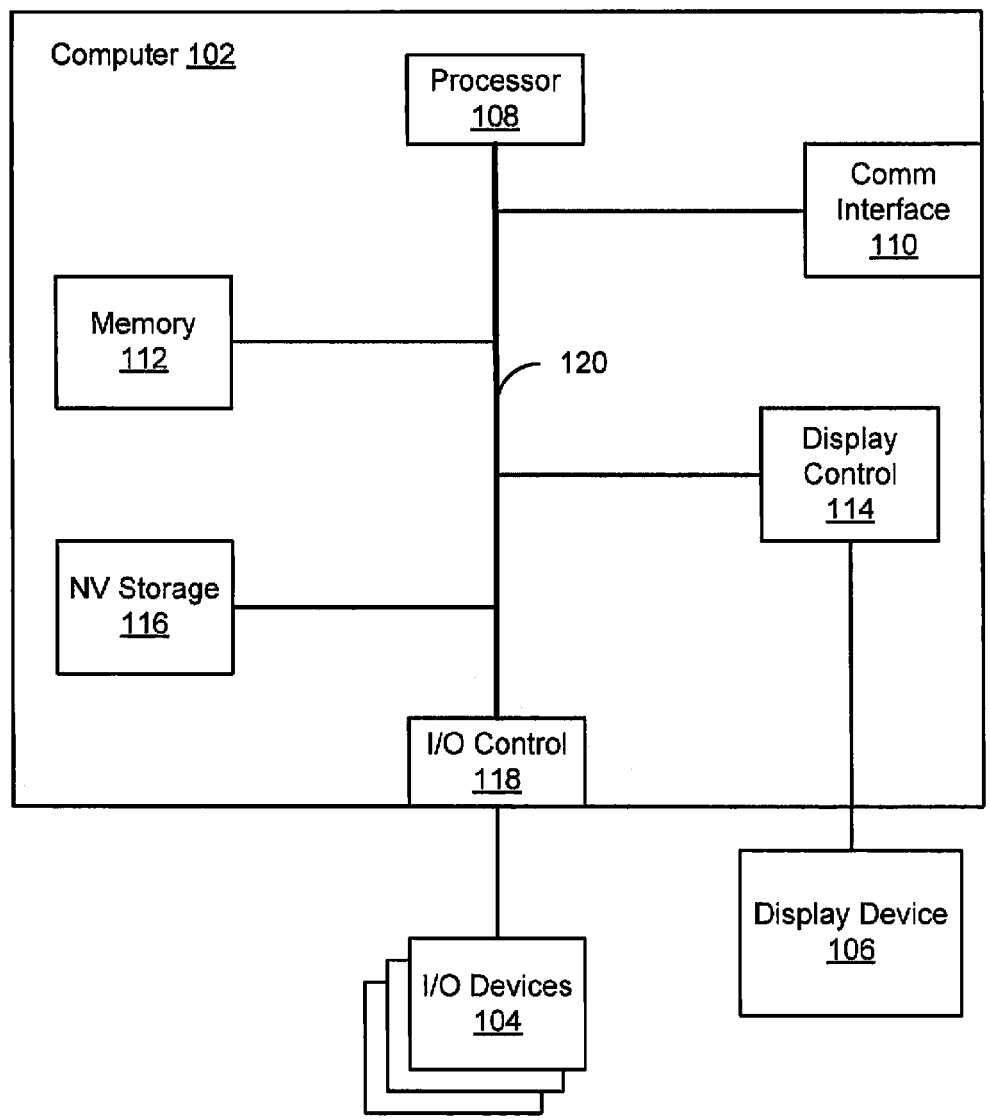
FIG. 1 depicts a computer system suitable for implementation of the techniques described herein.

FIG. 1 depicts a computer system 100 suitable for implementation of the techniques described herein. The computer system 100 includes a computer 102, I/O devices 104, and a display device 106. The computer 102 includes a processor 108, a communications interface 110, memory 112, display controller 114, non-volatile storage 116, and I/O controller 118. The computer 102 may be coupled to or include the I/O devices 104 and display device 106.

The computer 102 interfaces to external systems through the communications interface 110, which may include a modem or network interface. The communications interface 110 can be considered to be part of the computer system 100 or a part of the computer 102. The communications interface 110 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 110 optional in the strictest sense of the word.

The processor 108 may include, by way of example but not limitation, a conventional microprocessor such as an Intel Pentium microprocessor or Motorola power PC microprocessor. While the processor 108 is a critical component of all conventional computers, any applicable known or convenient processor could be used for the purposes of implementing the techniques described herein. The memory 112 is coupled to the processor 108 by a bus 120. The memory 112, which may be referred to as "primary memory," can include Dynamic Random Access Memory (DRAM) and can also include Static RAM (SRAM). The bus 120 couples the processor 108 to the memory 112, and also to the non-volatile storage 116, to the display controller 114, and to the I/O controller 118.

The I/O devices 104 can include a keyboard, disk drives, printers, a scanner, and other input and output devices, including a mouse or other pointing device. For illustrative purposes, at least one of the I/O devices is assumed to be a block-based media device, such as a DVD player. The display controller 114 may control, in a known or convenient manner, a display on the display device 106, which can be, for example, a cathode ray tube (CRT) or liquid crystal display (LCD).

The display controller 114 and I/O controller 118 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 116, which may be referred to as "secondary memory," is often a magnetic hard disk, an optical disk, or another form of storage for large amounts of data. Some of this data is often written, by a direct memory access process, into memory 112 during execution of software in the computer 102. The non-volatile storage 116 may include a block-based media device. The terms "machine-readable medium" or "computer-readable medium" include any known or convenient storage device that is accessible by the processor 108 and also encompasses a carrier wave that encodes a data signal.

The computer system 100 is one example of many possible computer systems which have different architectures. For example, personal computers based on an Intel microprocessor often have multiple buses, one of which can be an I/O bus for the peripherals and one that directly connects the processor 108 and the memory 112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 112 for execution by the processor 408. A Web TV system, which is known in the art, is also considered to be a computer system, but it may lack some of the features shown in FIG. 1, such as certain input or output devices. A typical computer system will usually include at least a processor, memory, and a bus coupling the memory to the processor.

The computer system 100 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Microsoft Vista®, Linux, and Mac OS®. Delineating between the OS and application software is sometimes rather difficult. Fortunately, delineation is not necessary to understand the techniques described herein, since any reasonable delineation should suffice.

Typically, the OS provides a customary hierarchical directory and file based organization of data stored on the flash memory device. In addition it enforces typical access control based on read, write, and execute permissions on directories and files. This access control is enforced when data accesses to the flash are made through the operating system, which itself is part of an authenticated secure OS on a secure device.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, ROM, RAM, EPROM, EEPROM, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 2:
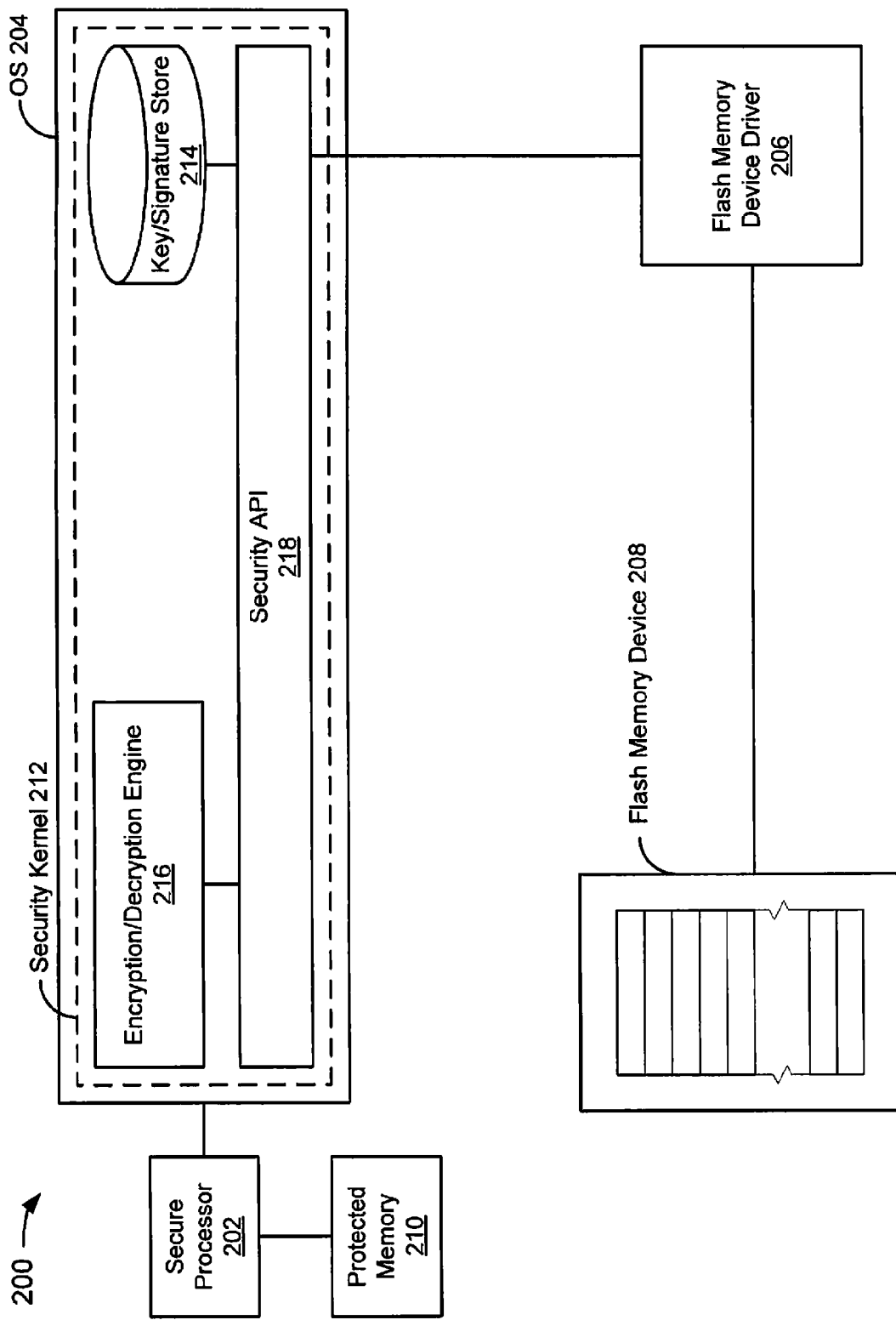
FIG. 2 depicts an example of a secure system suitable for implementation of the techniques described herein.

FIG. 2 depicts an example of a secure system 200 suitable for implementation of the techniques described herein. A typical secure system 200 may include a pay-per-view device, game console, media player, an embedded secure device, a "conventional" PC with a secure processor, or some other computer system that includes a secure processor.

In the example of FIG. 2, the secure system 200 includes a secure processor 202, an OS 204, a flash memory device driver 206, a flash memory device 208, and protected memory 210. In the example of FIG. 2, the OS 204 includes a security kernel 212, which in turn includes a key store 214, an encryption/decryption engine 216, and a security API 218. In another embodiment, security kernel 212 may contain a Random Number Generator (RNG) (not shown). It should be noted that one or more of the described components, or portions thereof, may reside in the protected memory 210, or in unprotected memory (not shown).

It should further be noted that the security kernel 212 is depicted as residing inside the OS 204 by convention only. It may or may not actually be part of the OS 204, and could exist outside of an OS or on a system that does not include an OS. For the purposes of illustrative simplicity, it is assumed that the OS 204 is capable of authentication. In an embodiment, the flash memory device driver 206 may also be part of the OS 204. This may be desirable because loading the flash memory device driver 206 with authentication can improve security.

An example of a flash memory device that may be used as the flash memory device 208 is described later with reference to FIG. 3. The flash memory device driver 206 stores data to and reads data from the flash memory device 208. The flash memory device driver 206 has a unique protected or secret key associated with it which is stored in the key store 214 of the security kernel 212. In an alternative, a protected key may be stored using the random number generator (RNG) (not shown) capabilities stored in the security kernel 212. The security kernel 212 enforces the use of the protected key. In an embodiment, the flash memory device driver 206 owns a key(s) in the key store 214 in the security kernel 212, which is not accessible by another I/O driver, e.g., networking. The security kernel 212 is exposed to the security API 218, and the flash memory device driver 206 may use the protected key to encrypt and decrypt or calculate a Message Authentication Code (MAC) or a keyed-Hash Message Authentication Code (HMAC).

For illustrative simplicity, the protected memory 210 is represented as a single memory. However the protected memory 210 may include protected primary memory, protected secondary memory, and/or secret memory. It is assumed that known or convenient mechanisms are in place to ensure that memory is protected. The interplay between primary and secondary memory and/or volatile and non-volatile storage is known; so a distinction between the various types of memory and storage is not drawn with reference to FIG. 2.

In an embodiment, the security kernel 212 may be loaded at start-up. In another embodiment, a portion of the security kernel 212 may be loaded at start-up, and the remainder loaded later. Any known or convenient technique may be used to load the security kernel 212 in a secure manner.

The key store 214 is a set of storage locations for keys such as the protected key of the flash memory device driver 206. The key store 214 may be thought of as an array of keys, though the data structure used to store the keys is not critical. Any applicable known or convenient structure may be used to store the keys. In a non-limiting embodiment, the key store 214 is initialized with static keys, but variable keys are not initialized (or are initialized to a value that is not secure). For example, some of the key store locations are pre-filled with trusted values (e.g., a trusted root key) as part of the authenticated loading of the security kernel 212. The private key in the non-volatile memory could be retrieved and stored in the keystore for future use.

The encryption/decryption engine 216 is, in an embodiment, capable of both encryption and decryption. For example, in operation, an application may request of the security API 218 a key handle that the application can use for encryption. The encryption/decryption engine 216 may be used to encrypt data using the key handle. Advantageously, although the security API 218 provides the key handle in the clear, the key itself never leaves the security kernel 212.

The security API 218 is capable of performing operations using the keys in the key store 214 without bringing the keys out into the clear (i.e., the keys do not leave the security kernel 212 or the keys leave the security kernel 212 only when encrypted). The security API 218 may include services to create, populate and use keys (and potentially other security material) in the key store 214. In an embodiment, the security API 218 also provides access to internal secrets and non-volatile data, including secret keys and device private key(s). For example, the flash memory device driver 206 private key might be stored in the key store 214 and used by the security API 218. One API call could be used to return a device certificate (using an algorithm discussed herein to generate the certificate). Another API call can be constructed to use the private key to compute a shared key for decryption, or use the private key to sign a message or certificate. Depending upon the implementation, the security API 218 may support cryptography operations using hardware acceleration.

Figure 3:
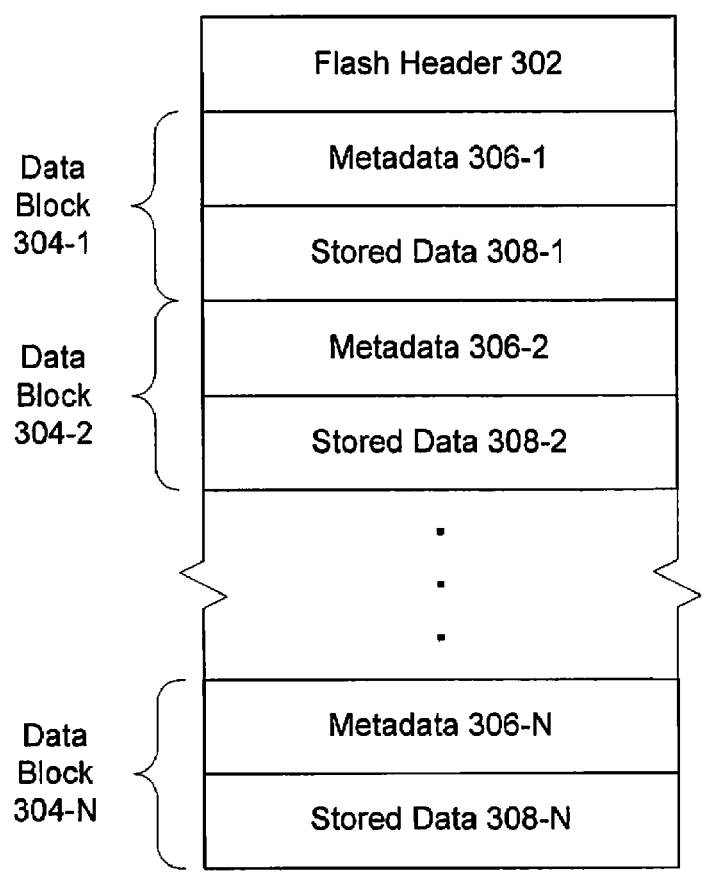
FIG. 3 depicts an example of a flash memory device.

FIG. 3 depicts an example of a flash memory device 300.

The flash memory device 300 includes flash header 302 and data blocks 304-1 to 304-N (referred to collectively as the data blocks 304). In an illustrative embodiment, the flash header 302 includes a Global Version Number for the flash memory device (GVN_f), which is described later.

One or more of the data blocks 304 are associated with a file stored in the flash memory device 300. The data blocks 304 include respective metadata 306-1 to 306-N (referred to collectively as metadata 306) and stored data 308-1 to 308-N (referred to collectively as stored data 308). Stored data 308 in data blocks 304 may be encrypted using such encryption functions as, by way of example but not limitation, DES or AES. In the illustrative embodiment in the discussion that follows, each data block is protected by a MAC and a file Version Number (VN_f), which are described later.

In an illustrative embodiment, metadata 306 is stored in spare area of flash pages. Spare area may be physically located before, after, or within the data area that includes the stored data 308. Thus, in the example of FIG. 3, the depiction of the metadata 306 "above" the stored data 308 is for illustrative purposes only, and should not be construed as a limitation.

An operating system or secure kernel, through the use of a flash memory device driver, may provide a customary hierarchical directory and file structure stored in the flash memory device 300. In addition, the operating system or security kernel may enforce typical access controls based on read, write, and execute permissions on files stored in the flash memory device 300. This access control may be enforced when request for access to the stored data 308 is made from a secure device. This does not, alone, protect the device against security breaches that involve removing the flash memory device 300 and reading or reprogramming the device external to the secure device on a different device, thereby circumventing the protections of the secure device. Customers may use a variety of known or convenient devices that allow the flash memory device 300 to be not only readable but also writeable. A further security mechanism may be desirable to protect against this.

In an illustrative embodiment, to provide security to the data blocks 304, the stored data 308 of each of the data blocks 304 is encrypted, and a calculated MAC is stored along with the block. Conversely, stored data 308 read from each data block 304 is decrypted, and the calculated MAC is verified. The order is interchangeable.

Calculating the MAC

A number of variables may be mandatorily included to the flash memory data block to calculate the MAC. In an illustrative embodiment, the inclusion of informative data is enforced by trusted software in a security kernel as part of the MAC calculation. In a specific implementation of this embodiment, the trusted software and flash device driver are the only means to access the flash device, and that, in turn, may be enforced by hardware and software mechanisms. This potentially ensures stored data in each data block becomes unusable if the flash memory device is tampered with.

The specific trusted device driver is alone given access to the relevant key and informative data to compute a suitable HMAC. Any other part of the operating system or untrusted software is prevented, by the security kernel, from creating usable or verifiable data on the flash device. This enforcement is performed by the security kernel by using privileged data to identify the caller of a security API. This might include, as examples, process ID, thread ID, user ID, and other techniques used to separate the ownership space.

One value that could be included in the calculation of the MAC is a unique value that is assigned to each file and stored in a flash header as conventional file metadata. Another value that could be included in the calculation of the MAC is a value that represents a logical block index of each flash memory data block and stored in spare area. Other variables that could be included in the calculation of the MAC include physical block numbers, owner ID variables of either an application or the computer system, or application ID variables. In addition, an application can request an ID to be tagged to data written to the file that is managed by the application. The tagging ID could be included in the calculation of the MAC. This way that application can manage the protection of data blocks of two managed files from each other.

In an illustrative embodiment of a method for creating an authentication code, one might create a value HMAC h=HMAC(data) where data is the array. In such an embodiment, a user may supply the data array, and the security kernel may enforce appending a few mandatory values, for example:

h=HMAC(data, file_name, block_number, physical_address)

In some cases, the application might request the addition of a tagging ID. For example, a user may supply the data array and the tagging ID as inputs to the API and the security kernel may compute:

h=HMAC(data, file_name, block_number, physical_address, tagging_ID)

The location and sequences of these quantities are not fixed and can be varied in practice as long as the same fixed order is used for verification in the kernel. The important aspect is that this tagging of these quantities cannot be suppressed, controlled, or treated optional on this device, by the caller. The trusted kernel will enforce the rules as necessary to add the authentication information to the block of data.

Versioning the Data

In some applications, it is desirable to maintain the current or latest version of a file or data in a flash memory device to prevent roll backs to an earlier version. This provides protection for the client because it prevents a user from substituting flash memory devices and manipulating stored data in the flash memory data blocks. This can be particularly desirable if usage data, consumption information, or pay-per-view information is stored on the flash memory device. This may also be useful to store security information like server validity or revocation lists, where the information should be updated and maintained at the current version number. Software patching and updating mechanisms, including mandatory security updates, could also use this feature to implement secure versioning.

In an illustrative embodiment, a security kernel enforces a strict increase of version numbers. The security kernel may store GVN_n in secure non-volatile memory. This number is updated when any versioned file is updated, and it is accessible and updateable by, for example, an operating system by making an API call to the security kernel.

The flash header of a flash memory device may include file system metadata, including a value GVN_f, which may be in sync with the value GVN_n. The metadata is, in an illustrative embodiment, itself protected by a MAC created using any necessary or desirable informational values. The flash header may also include version numbers, VN_f, respectively associated with each file stored on the flash memory device.

When the version number of a versionable file changes, the VN_f associated with the file is updated GVN_f and GVN_n are subsequently updated, the MAC is recalculated, and the resultant MAC is stored. Thus, a change in version number of a file affects the MAC of the set of the data blocks associated with the file. GVN_n in this embodiment is a part of NV memory inside the chip and only accessible to the security kernel, making it exceptionally resistant to tampering. This provides a flexible mechanism whereby the hardware security on the secure chip is extended to implement secure versioning on the flash memory device, and versioning applies only to the files that use versioning. This latter method is useful if the number of writes to non-volatile memory is to be conserved. This general technique extends the protection of tamper resistant on-chip rewritable memory to maintain secure versioning of data stored in the flash memory data blocks. If desired by the end user, secure versioning could be mandated to include all files or flash data blocks on the flash memory device.

Storing a Versioned File

Figure 4:
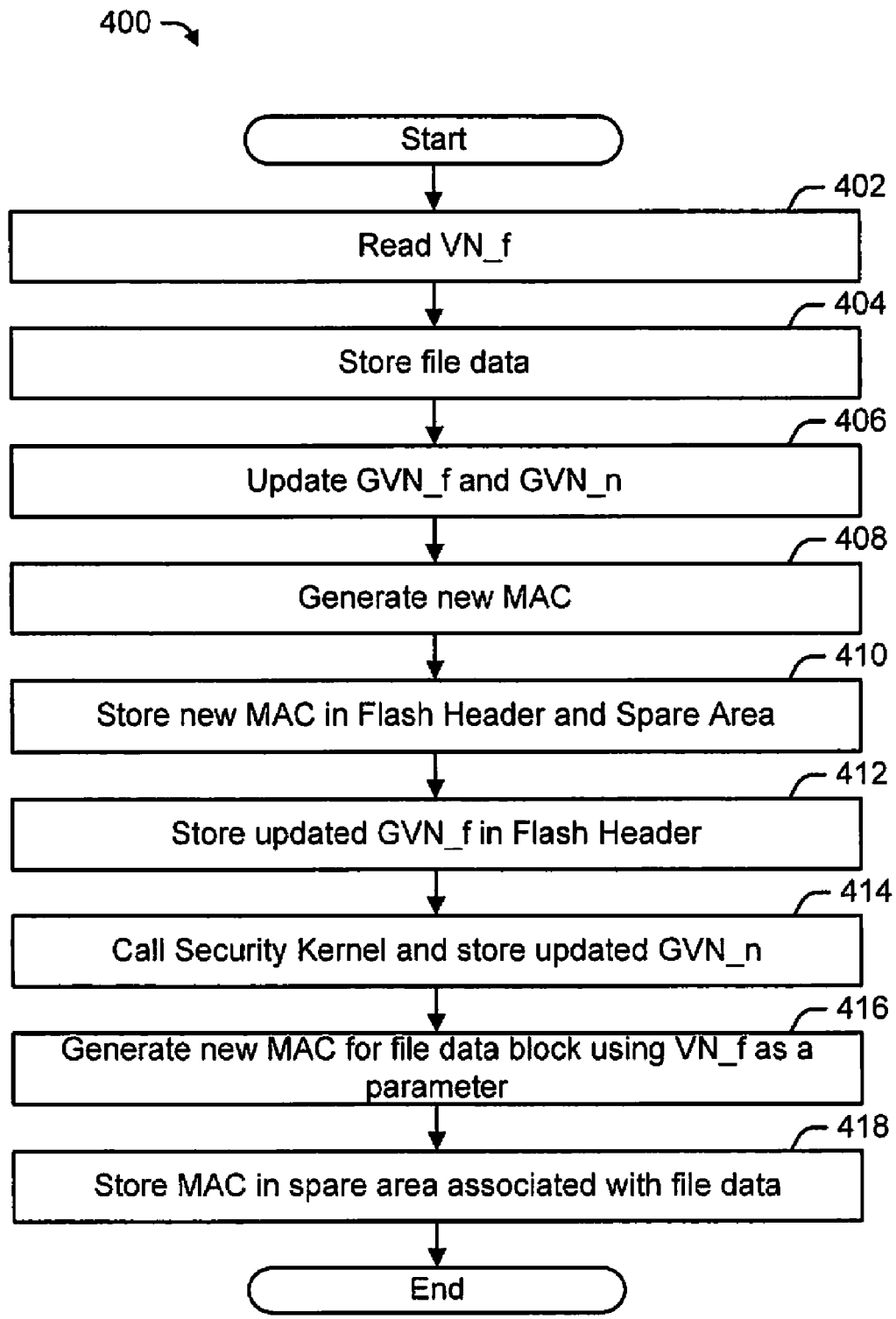
FIG. 4 depicts a flowchart of an example of a method for storing a versioned file.

FIG. 4 depicts a flowchart 400 of an example of a method for storing a versioned file. The flowchart starts at module 402 with reading the VN_f. The flowchart continues to module 404 with storing file data on a flash memory device. The flowchart continues to module 406 with updating of GVN_f and GVN_n. The flowchart continues to module 408 with generating a new MAC. The flowchart continues to module 410 with storing the new MAC in the flash header of the flash memory device and spare area of flash memory blocks in which file data is stored. The flowchart continues to module 412 with storing the updated GVN_f in the flash header and spare area(s). The flowchart continues to module 414 with storing the updated GVN_n by making a call to the security kernel. The flowchart continues to module 416 with generating a new MAC for a file data block using VN_f as a parameter. The flowchart continues to module 418 with storing the MAC in spare area associated with the file data. Then, the flowchart ends.

Reading a Versioned File

Figure 5:
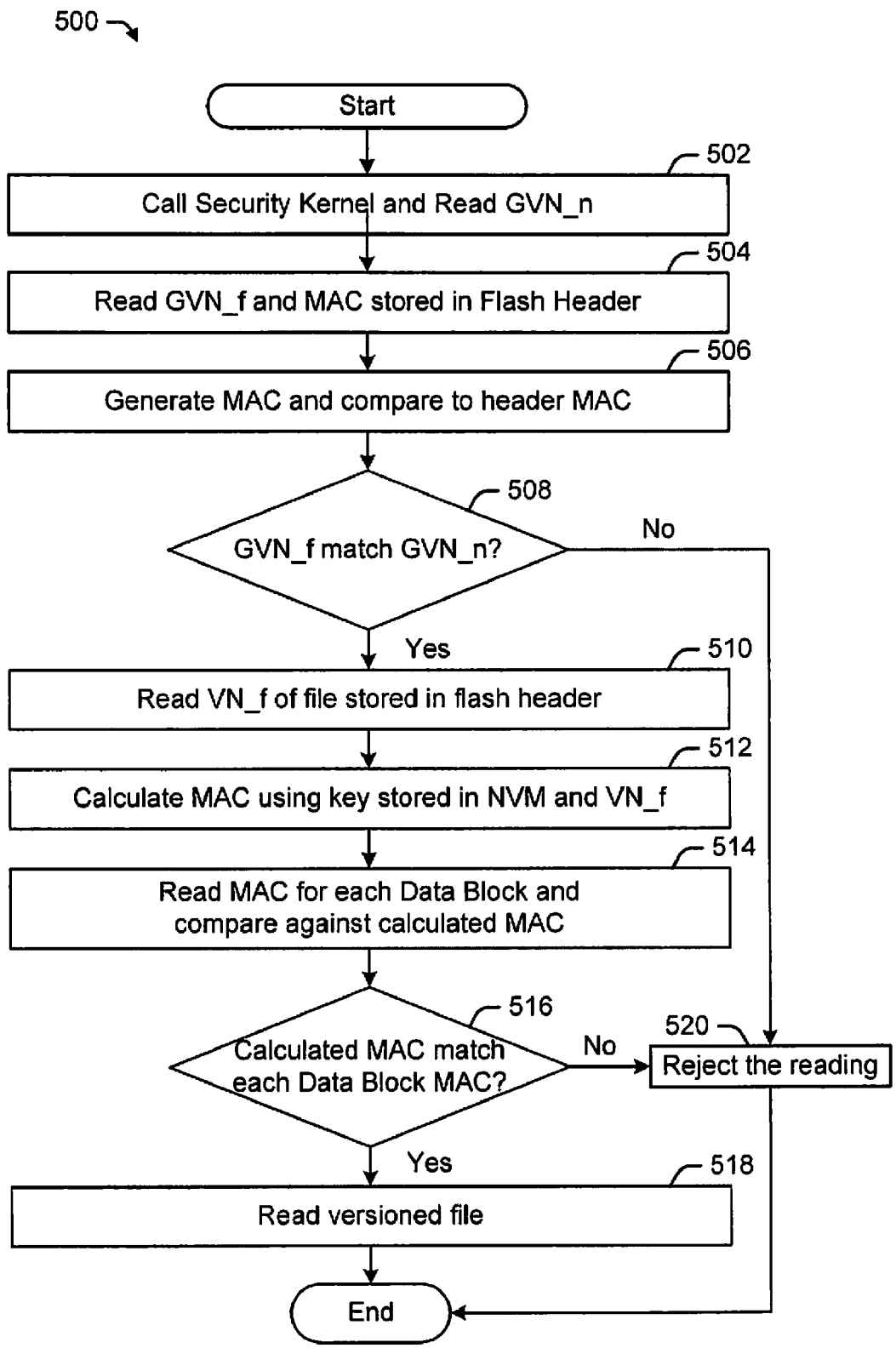
FIG. 5 depicts a flowchart of an example of a method for reading a versioned file.

FIG. 5 depicts a flowchart 500 of an example of a method for reading a versioned file. The flowchart starts at module 502 with making a call to the security kernel and reading GVN_n. The flowchart continues to module 504 with reading GVN_f and the MAC stored in the flash header. The flowchart continues to module 506 with generating a MAC and comparing it to the MAC in the flash header. The flowchart continues to decision point 508 where GVN_f is checked against GVN_n to see if the two match. If GVN_f and GVN_n do not match, the flowchart continues to module 520 where the reading is rejected, and the flowchart ends. If GVN_f and GVN_n match, the flowchart continues to module 510 with reading a VN_f of the file. The flowchart continues to module 512 where, using the key stored in NVM and VN_f, a MAC is calculated. The flowchart continues to module 514 with reading the MAC stored with each data block and comparing against the calculated MAC. The flowchart continues to decision point 516 where the calculated MAC is compared with each data block MAC. If the calculated MAC and each data block MAC do not match, the flowchart continues to module 520 where the reading is rejected, and the flowchart ends. If the calculated MAC and each data block MAC match, the flowchart continues to module 518 with reading the versioned file. Then, the flowchart ends.

Advantageously, if someone attempted to replace a data block from a prior version, the HMAC would have included implicitly a prior version number, and hence would not match against the HMAC computed with the correct number in the verified metadata.

Storage of MAC

In an illustrative embodiment, the MAC is 20 bytes in length and stored in the flash header 302 and each metadata and spare area 306 of the file. The block headers of the files may utilize data block spare area along with bit error information (ECC) and status information. The benefit of storing this information in the spare area is that it is read along with the data without additional overhead, and the spare area is utilized to accommodate this extra MAC information rather than including it with the stored data 308 on the data block 304.

Another aspect of storage involves robustness against single bit and double bit errors on flash. Two copies of the MAC are capable of being stored in the spare area. If each of the two MACs is verified with the MAC calculated by the security kernel 108, the information stored in stored data 308 is considered valid. If only one of the two MACs is verified, the unverified MAC is assumed to have a single bit error. The block is copied to another data block 304, a new MAC pair is written to a new block, and the old block is regarded as freed. If neither MAC verifies, the data is assumed tampered with or a multi-bit error is assumed. Block access returns a failure, and stored data 308 of data block 304 is not read.

The usage of spare area to store the MAC is justified as shown in the following example: Consider a 128 MB flash part that is organized into logical blocks, each including eight 2K byte pages. The spare area of each page includes one status byte per page, and 3 ECC bytes for every 512 bytes. If two copies of the MAC are factored into the equation, the result reflects that $((2*20)+8+(3*4*8))=144$ bytes of the spare area are used. The model has 512 bytes of spare area for each block; thus, there is sufficient space to include two MAC values along with the ECC information in the spare area.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
    encrypting data of a versionable file having an associated file version number, the encrypting based on a key stored in a security kernel;
    storing the encrypted data as stored data in one or more flash memory data blocks of a flash memory device that includes a flash header and flash memory data blocks;
    updating a flash header global version number and a security kernel global version number;
    generating a cryptographic message authentication code (MAC) covering the data and informational variables, wherein the informational variables are generated by or accessible to the operating system software, wherein at least some of the variables are not stored on the flash device;

storing the MAC in the flash header and the one or more flash memory data blocks;

storing the updated flash header global version number in the flash header;

requesting in the clear a key handle to the key in the security kernel and storing the updated security kernel global version number in a key/signature store in the security kernel;

generating a new MAC for the one or more flash memory data blocks using the file version number as a parameter;

storing the new MAC in the one or more flash memory data blocks;

retrieving the encrypted data and the MAC from the one or more flash memory data blocks;

performing a validation check on the retrieved data using the MAC;

rejecting the retrieved data if the retrieved data fails the validation check;

if the retrieved data passes the validation check;
accepting the retrieved data;
decrypting the retrieved data.

2. The method of claim 1, further comprising using a DES or an AES method to encrypt and decrypt data.

3. The method of claim 1, further comprising storing the MAC in spare area of the flash memory block.

4. The method of claim 1, wherein the MAC is generated using an HMAC technique.

5. The method of claim 1, wherein storing the MAC includes storing a copy of the MAC in spare area.

6. The method of claim 1, wherein the plurality of variables accessible to the operating system software is selected from one or more of a group consisting of a value determined by software means of the operating system during run-time, a unique number that is assigned to the file and stored with file-specific meta data, a value representing a logical block index, a physical block number of the flash memory block, a variable associated with an application.

7. The method of claim 1, wherein the plurality of variables accessible to the operating system software includes an application variable, wherein the application variable includes one or more values selected from the group consisting of an application ID parameter, an input to a security kernel for use as part of the data covered by the message authentication code, a version number of the data in the flash memory block.

8. A system comprising:
a flash memory device including at least one flash memory block;
a flash memory device driver embodied in a computer-readable medium;
a security kernel embodied in a computer-readable medium, the security kernel comprising a key/signature store;
wherein, in operation:
the security kernel:
generates a MAC using a plurality of variables accessible to operating system software;
receives from the flash memory device driver a request in the clear for a key handle to a key stored in the key/signature store;
stores an updated security kernel global version number based on the request in the clear;
generates a new MAC for the flash memory block using a file version number as a parameter;
performs a validation check using the new MAC;

the flash memory device driver facilitates:
sending the request in the clear for the key handle;
sending the MAC to the flash memory device for storage in the flash memory block;
storing the MAC in the flash header of the flash memory device;
storing an updated flash header global version number in the flash header;
receiving the MAC from the flash memory block.

9. The system of claim 8, wherein the MAC is stored in the flash memory block spare area.

10. The system of claim 8, wherein a protected key associated with the flash memory device driver is stored in secret non-volatile memory accessible through the security kernel.

11. The system of claim 8, further comprising an encryption engine, embodied in a computer-readable medium, for encrypting data for storage in or read from the flash memory block.

12. The system of claim 8, a wherein the security kernel comprises a decryption engine, embodied in a computer-readable medium, for decrypting data for storage in or read from the flash memory block.

13. A method comprising:
reading a file version number associated with a versionable file;
storing file data in one or more flash memory blocks of a flash memory device;
updating a copy of a global version number on the flash memory device, wherein the global version number is associated with all versioned files stored, at least in part, on the flash memory device;
receiving, in the clear, a key handle of a key stored in a secure kernel, the key used to encrypt data;
updating, using the key, the global version number in non-volatile memory of the secure kernel;
generating a MAC, to protect the global version number, using a plurality of variables accessible to operating system software;
storing the MAC in the one or more flash memory blocks of the flash memory device;
storing a copy of the updated global version number in the one or more flash memory blocks of the flash memory device;
storing, using the key, the global version number in non-volatile memory of the security kernel.

14. The system of claim 13, further comprising saving the MAC in spare area of the one or more flash memory blocks.

15. The method of claim 13, wherein the MAC is generated using an HMAC technique.

16. The method of claim 13, wherein the plurality of variables accessible to the operating system software includes one or more variables selected from the group consisting of a value that is determined by software means of the operating system during run-time, a unique number that is assigned to the file and stored with the file-specific meta data, a number representing a logical block index, a physical block number of the flash memory block, an owner ID of a computer system associated with the security kernel, a variable associated with an application.

17. The method of claim 16, wherein the variable associated with an application includes a value selected from the group consisting of, an application ID parameter, an ID parameter tagged by the application and written to the flash memory device, the version number of the data in the flash memory block.

18. The method of claim 13, wherein storing the MAC includes storing the MAC in spare area of the flash memory block.

19. The method of claim 13, wherein storing the MAC includes storing a copy of the MAC.

20. The method of claim 19, wherein storing a copy of the MAC includes storing the MAC in spare area of the flash memory block.

21. The method of claim 13, further comprising signing a block including the global version number, using at least some parameters not stored on the device.

22. The method of claim 21, including a file specific version number associated with each versioned file in the block.

23. The method of claim 22, further comprising using the file specific version number as a variable in calculating the MAC that protects data blocks of the versioned file.

* * * * *